(12) United States Patent
Thomas

(10) Patent No.: US 6,565,358 B1
(45) Date of Patent: May 20, 2003

(54) LANGUAGE TEACHING SYSTEM

(76) Inventor: Michel Thomas, 156 Fifth Ave., Suite 1011, New York, NY (US) 10010

( * ) Notice: Subject to any disclaimer, the term of this patent is extended or adjusted under 35 U.S.C. 154(b) by 0 days.

(21) Appl. No.: 09/573,854

(22) Filed: May 18, 2000

(51) Int. Cl.$^7$ ................................................ G09B 19/08
(52) U.S. Cl. ..................... 434/157; 434/169; 434/156; 434/321
(58) Field of Search ................................ 434/157, 156, 434/185, 169, 167, 319–321, 365

(56) References Cited

U.S. PATENT DOCUMENTS

| | | | | |
|---|---|---|---|---|
| 2,777,901 A | * | 1/1957 | Dostert | 434/157 |
| 3,983,639 A | * | 10/1976 | Podkopaev et al. | 434/157 |
| 4,135,314 A | * | 1/1979 | Yamamoto | 434/157 |
| 4,139,954 A | * | 2/1979 | Yamamoto | 434/157 |
| 4,354,841 A | * | 10/1982 | Meeder | 434/157 |
| 4,380,438 A | * | 4/1983 | Okamoto | 434/157 |
| 4,710,130 A | * | 12/1987 | Aarons | 434/157 |
| 5,180,307 A | * | 1/1993 | Hiramatsu | 434/157 |
| 5,433,609 A | * | 7/1995 | Deaver et al. | 434/156 |
| 5,607,310 A | * | 3/1997 | Cholley | 434/157 |
| 6,108,515 A | * | 8/2000 | Freeman | 434/321 |

\* cited by examiner

*Primary Examiner*—Joe H. Cheng
*Assistant Examiner*—Kathleen M. Christman
(74) *Attorney, Agent, or Firm*—Reed Smith LLP

(57) ABSTRACT

A recorded technique for teaching a target language to a student having a home language in which each expression in the home language is presented and, under control of the student, time is provided for the student's oral translation thereof. Subsequent to the student's oral translation, a first example student translation of the expressions to the target language is provided and subsequently a second example student's translation of the target language is provided. One ID of the example students is preferably male and the other is preferably female. Then a teacher's translation of the expression into the target language is provided. The sequence is repeated for a series of expressions. To facilitate student comfort and reduce anxiety, the student can provide pauses wherever convenient and in particular the system gives the student time to translate the expression provided from the student's home language into the target language.

12 Claims, 2 Drawing Sheets

LANGUAGE TEACHING SYSTEM

BACKGROUND OF THE INVENTION

This invention relates in general to a technique for teaching a target language to a target student whose home language is different from the target language.

Techniques for teaching foreign languages involve either immersion in a foreign language or a classroom setting in which a teacher provides instructions, usually translations, which are to be memorized. There are also techniques whereby sets of expressions in the home language are set down in tabular form next to the translations of those expressions into a target language. The student then compares the two when it comes to memorize the relationship.

These and other techniques have certain advantages. But they all tend to introduce a measure of strain into the learning process. Strain in a learning process tends to inhibit the rate at which an individual can learn.

Accordingly, a major purpose of this invention is to provide a teaching system, including apparatus and method, which minimizes the strain to the student.

It is a related purpose of this invention to provide a teaching technique that is in one significant part under the control of the student.

BRIEF DESCRIPTION

In brief, the technique involves a process through which a student, for each of a set of expressions listens to a recorded expression in the home language, and then with a pause under control of the student, translates the expressions into the target language. The term "expression" herein will be used to refer to either a single word, a phrase, a sentence or a multiple number of sentences. The process does not involve visual aids of any kind; it is cognitive and relies solely on the senses of hearing and speaking.

A pause button is provided to the target student on the machine in which the tape or recorded medium is played so that the student can initiate a pause after the initial statement of the expression in the home language. This gives the student time to think of his or her translation before proceeding. Indeed, the student can pause at any stage of the proceeding in order to maintain a personal pace without ever experiencing stress, strain or pressure.

According to the technique, the teacher first explains how to formulate expressions in the target language with examples of expressions in the home language to be translated into the target language. As the teacher presents an expression in the home language, the target student responds by pressing the pause button and translating the given expression in the target language out loud. After translating the expression to the target language and releasing the pause button, the student proceeds to listen to a recorded translation of the same expression by one or more example students, usually one of each gender, at approximately the same level of comprehension or understanding that the target student has. The example students, who are also initially naive to the target language while being recorded, essentially form an interactive learning group with the target student. After hearing how his or her peers translate, the target student then listens to a recorded correct translation by a teacher skilled in the target language. The comparison of the target student's own translation with the translation of a same-level example student and then with the translation by a skilled teacher, the target student masters how to progress from the stage where the student is at to a more skilled stage. The identification with the example student or students and learning alongside—in an unhurried speed controlled by the target student—fully eliminates the tension or strain involved.

The system involves a plurality of the above set of routines covering a large number of expressions. It is important to include in the plurality of sets, replications of individual expressions so that the target student is exposed to the same expression a number of times.

The language teaching system represents a total approach to language acquisition rather than on unconnected grammar and fragmentary conversation. The goal of the system is language learning with no tension and no anxiety. It propels the student's progress in a relaxed ambience that is conducive to learning. Most important, it eliminates rote learning, memorization and drill. Whatever the target language that the target student wishes to acquire, the system of instruction ensures the target student's progress. The system sets in motion a learning process that dynamically uses each target student's capabilities, always keeping pace with the student's cognitive style and rhythm. The system stimulates elf-motivation and offers constant reinforcement of each learner's sense of accomplishment, as described below. This approach permits the student to integrate his or her knowledge of the target language from the start of instruction. As the target student builds upon what he or she has learned, the student is able to form sentences from the beginning. The target student draws upon words that have become accessible to him or her, reinforced by example peer students and the teacher, fitting them into the structures of the language that the student is acquiring—and all the while, the target student is enabled to correct his or her own responses as the student progresses along the continuum.

DESCRIPTION OF THE PREFERRED EMBODIMENTS

Figure 1:
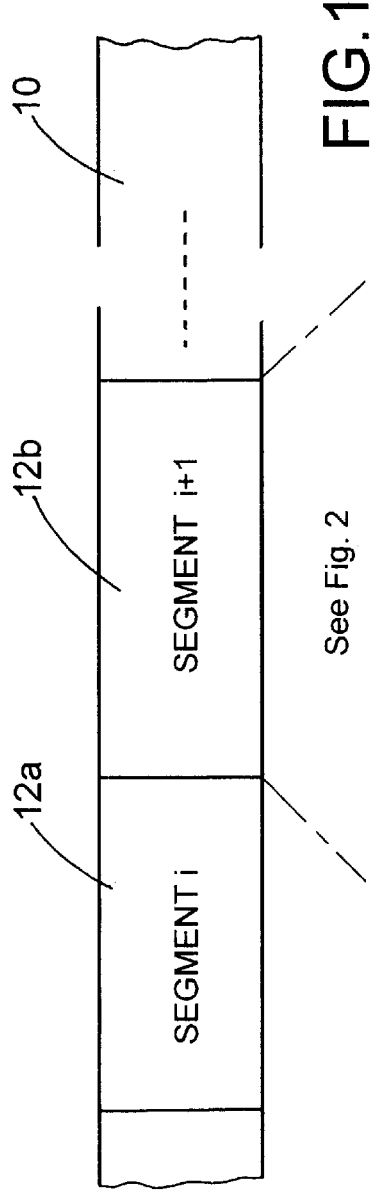
FIG. 1 illustrates two segments constituting a portion of a tape embodiment of this invention.
Figure 2:
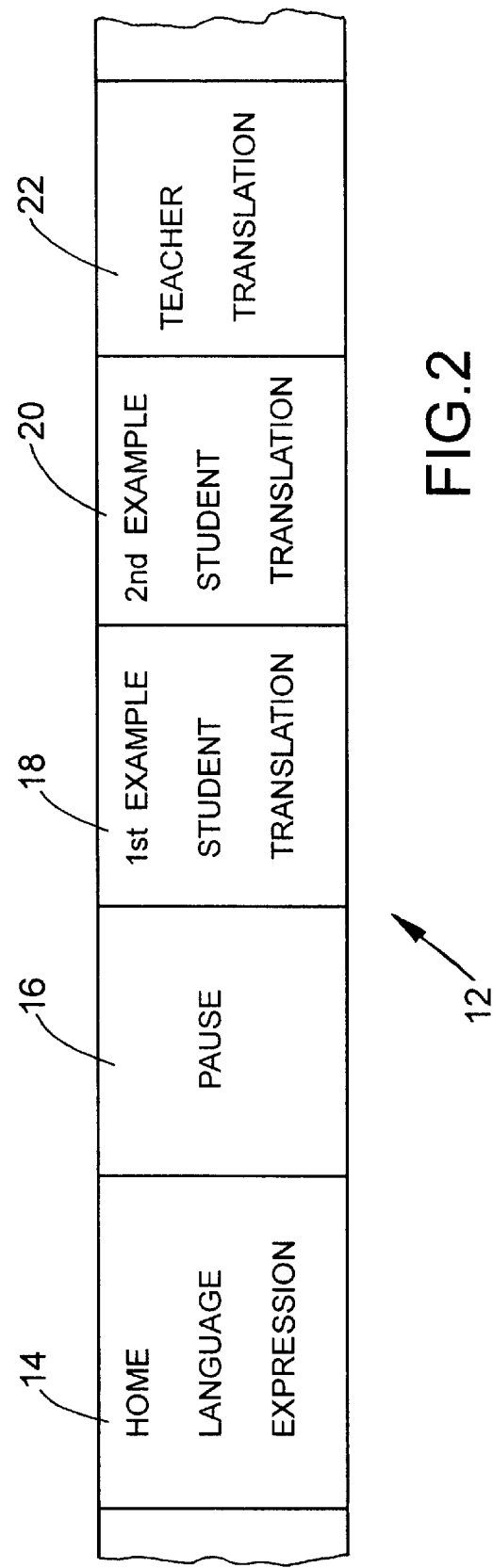
FIG. 2 illustrates five sub-segments of one of the FIG. 1 segments.

FIGS. 1 and 2 illustrate an embodiment of the invention on a magnetic tape medium. FIG. 1 shows a small portion of the tape 10 indicating two adjacent segments 12a, 12b. It should be understood that there are a large number of the segments 12 on the tape. On each of the segments 12, there are a number of sub-segments as illustrated in FIG. 2. Each segment 12 is an expression to be learned by the student. The term "expression" herein will be used to refer to either a single word, a phrase, a sentence or a multiple number of sentences. As recently contemplated, most of the segments will be dedicated to a single sentence.

As shown in FIG. 2, each segment 12 has five sub-segments. A first sub-segment 14 contains a recording of the expression in the home language of the target student.

The second sub-segment 16 is a pause sub-segment. In the preferred embodiment, there will be a prompt in the sub-segment 16, which prompt can be a beep to remind the student to turn off the recording machine so that the student can translate the expression he or she has just heard in sub-segment 14 from the home language into the target language. In the first dozen or so segments 12, the pause sub-segment 16 will contain the reminder beep. It is contemplated that the rest of the sub-segments 16 need not contain the beep as long as there is a pause; for example, of three to four seconds so that the student can react by pressing the stop button.

The third sub-segment 18 contains a translation by a first example student. The example student is normally at approximately the same level of knowledge with respect to the language as is the target student. This first example student translation is recorded regardless of any errors in the translation. In this fashion, the target student identifies with the translation and is likely to feel substantially less stress at any errors that the target student had made.

The fourth sub-segment 20 contains a second example student translation. This second example student translation like the first example student translation at 18, is recorded regardless of any errors and is for the purpose of putting the target student at ease.

Finally in sub-segment 22, the translation recorded is one made by a teacher who is skilled in the target language.

The five sub-segment routine is repeated in each segment 12 for a large number of different expressions. However, some, if not most, of the expressions are repeated multiple times in order to provide the student with a repetition that reinforces learning.

It should be kept in mind that the tape interval at sub-segment 16 does not represent the real time between a student listening to the expressions in sub-segments 14 and 18. The sub-segment 16 is on the tape in order to provide a time span in which a student can react by pressing the stop button on the machine so that the student can translate the expression out loud before proceeding to the sample student translation on the sub-segment 18.

Figure 3:
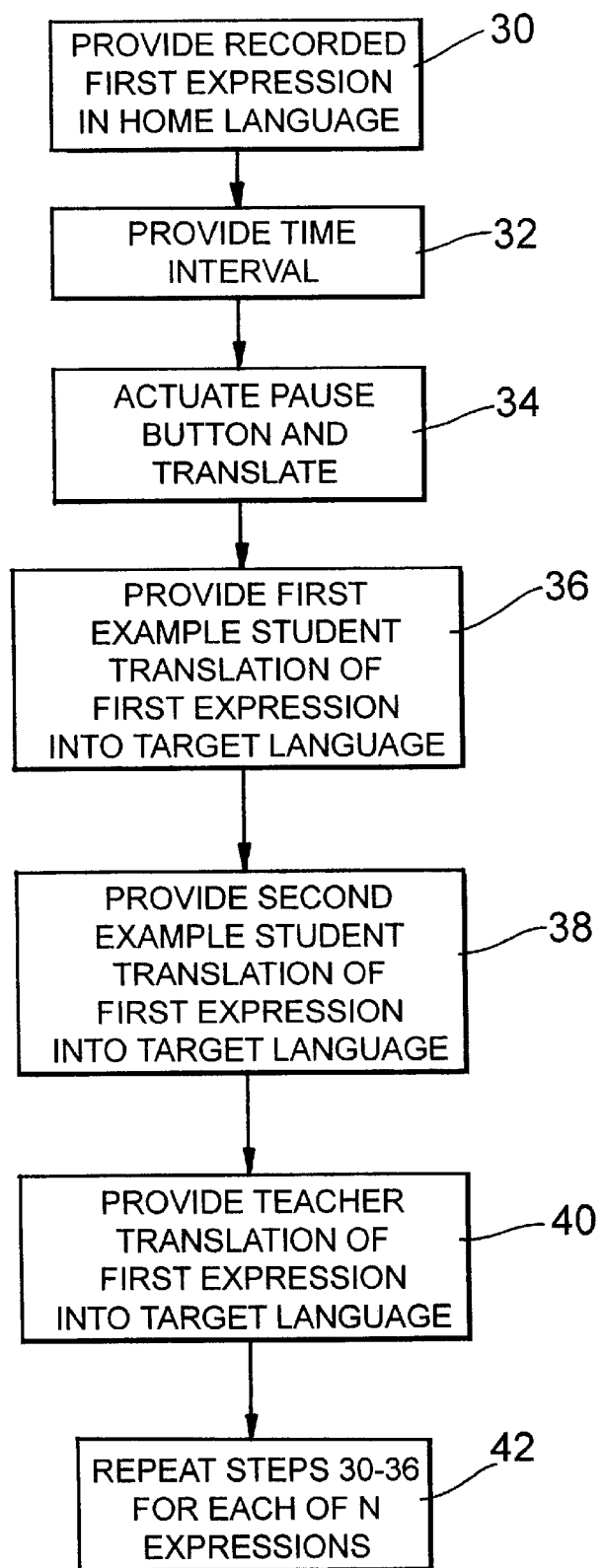
FIG. 3 is a flow diagram of the sequence of steps employing the tape illustrated in FIGS. 1 and 2.

The method is shown in the FIG. 3 flow chart. The first step 30 is to provide a recording of the first expression in the target student's home language. At step 32, a time interval is provided so that the student can react by pressing a pause button at step 34 and take whatever time the student needs to translate the expression. After this step 34, the student reactivates the record which then provides a first example student translation into the target language at step 36 and then a second example student translation into the target language at step 38. It is preferable that one of these two example students be female and the other male. After the two example student's translations at steps 36 and 38, the teacher translation of the expression to the target language is provided at step 40.

An important point is that both of the example students' translations at 36 and 38 are provided by students who are at approximately the same sophistication in the target language as is the student employing this record. Their translations are provided regardless of any error or pronunciation weakness. Thus the target student identifies with a typical peer in hearing two student translations prior to the translation by a teacher.

As shown in step 38, the steps 30 through 40 are repeated for each of any number of expressions. It is preferred that many of the expressions involved will be repeated a number of times during the course of the entire record.

Because the device is under the control of the student, the student is able to pause whenever necessary and is also able to go back and rerun any one or more expressions that a student desires.

What is claimed is:

1. A recorded medium adapted to be played on a predetermined playing device having a stop button for use in the learning of a target language by a target student who has a home language that differs from the target language comprising:

a plurality of expression segments, each of said segments containing in sequence:
   a. a recorded first sub-segment containing a first expression in the home language of the target student,
   b. a pause constituting a second sub-segment, said pause being sufficient to permit the target student to activate the stop button associated with the playing device in which said medium is played,
   c. a recorded third sub-segment containing a translation of said first expression by a first example student, said first example student translation being provided regardless of any error contained in said example student translation, and
   d. a recorded fourth sub-segment containing a translation of said first expression by a teacher skilled in said target language.

2. The medium of claim 1 wherein:
said plurality of expression segments includes multiple segments containing the same expression.

3. The medium of claim 1 further comprising:
a recorded additional sub-segment between said third and fourth sub-segments, said additional sub-segment containing a translation of said first expression by a second example student, said second example student translation being provided regardless of any error contained in said second example student translation.

4. The medium of claim 2 further comprising:
a recorded additional sub-segment between said third and fourth sub-segments, said additional sub-segment containing a translation of said first expression by a second example student, said second example student translation being provided regardless of any error contained in said second example student translation.

5. The medium of claim 3 wherein: one of said first and second example students is male and the other female.

6. The medium of claim 4 wherein: one of said first and second example students is male and the other female.

7. The method of learning a target language by a target student whose home language differs from the target language by playing a recorded medium on a playing device having a stop button, comprising the steps of:
   a. providing a multiple number of recorded expression segments on the medium,
   b. playing the recorded medium to provide a first on of said recorded expression segments in the home language of the target student,
   c. the target student actuating the stop button to create a pause in the playing of the recorded medium,
   d. the target student translating the recorded expression into the target language,
   e. playing the recorded medium to provide a first example student recorded translation of said first expression segment, the first example student translation being provided regardless of any error contained in said first example student translation,
   f. playing the recorded medium to prove a recorded translation of said first expression segment by a teacher skilled in said target language, and g. repeating each of said steps "b" through "f" for each of a multiple number of said recorded expression segments.

8. The method of claim 7 further comprising the step of:
providing multiple examples of the same expression in different ones of said recorded expression segments.

9. The method of claim 7 further comprising the step of:
e1. after said step of playing the recorded medium to provide a first example student recorded translation, playing the recorded medium to provide a second example student recorded translation of said first expression segment, said second example student translation being provided regardless of any error contained in said second example student translation,
said step of repeating including said step e1.

10. The method of claim 9 further comprising the step of:
providing multiple examples of the same expression in different ones of said recorded expression segments.

11. The method of claim 9 wherein one of said first and second example students is male and the other one is female.

12. The method of claim 10 wherein one of said first and second example students is male and the other one is female.

* * * * *